United States Patent [19]

Ackeret

[11] 4,243,279
[45] Jan. 6, 1981

[54] STACKING DEVICE

[75] Inventor: Peter Ackeret, Küsnacht, Switzerland

[73] Assignee: IDN Inventions and Development of Novelties AG, Switzerland

[21] Appl. No.: 2,960

[22] Filed: Jan. 12, 1979

[30] Foreign Application Priority Data

Jan. 20, 1978 [DE] Fed. Rep. of Germany ....... 2802460

[51] Int. Cl.³ ..................... A47B 87/00; F16B 12/00
[52] U.S. Cl. .................................. 312/107; 312/108; 312/111; 312/12; 108/64
[58] Field of Search ................. 312/107, 108, 111, 9; 211/126, 188; 108/64; 248/359.1

[56] References Cited

U.S. PATENT DOCUMENTS

| | | | |
|---|---|---|---|
| 511,617 | 12/1893 | Howard | 248/359.1 |
| 1,890,000 | 12/1932 | Oakley | 248/359.1 |
| 2,492,697 | 12/1949 | Higley | 312/204 |
| 2,557,630 | 6/1951 | Brown | 312/107 |
| 2,807,387 | 9/1957 | Siciliano | 312/107 |
| 3,203,744 | 8/1965 | Batke et al. | 312/108 |
| 3,283,915 | 11/1966 | Maslow | 211/126 |
| 3,514,170 | 5/1970 | Shewchuk | 312/107 |
| 3,743,372 | 7/1973 | Ruggerone | 312/108 |
| 3,758,181 | 9/1973 | Bolyos | 312/107 |
| 3,918,781 | 11/1975 | Paris | 312/111 |
| 3,999,818 | 12/1976 | Schankler | 312/107 |
| 4,026,615 | 5/1977 | Tazaki et al. | 312/111 |
| 4,056,295 | 11/1977 | Downing | 312/107 |
| 4,120,549 | 10/1978 | Bureau | 312/253 |

FOREIGN PATENT DOCUMENTS

| | | | |
|---|---|---|---|
| 1149509 | 5/1963 | Fed. Rep. of Germany | 312/107 |
| 2248408 | 1/1974 | Fed. Rep. of Germany | 312/9 |
| 685552 | 3/1965 | Italy | 312/111 |

Primary Examiner—Victor N. Sakran
Attorney, Agent, or Firm—H. Dale Palmatier

[57] ABSTRACT

A plurality of rectangular plates having stacking elements on their upper and lower surfaces, the stacking elements being complimentary to those on rectangular containers such that the plates can be connected between any two containers in a stack. The plates further have complimentary interconnecting elements on their lateral sides to allow locking together of adjacent stacks of containers into a compact block.

5 Claims, 5 Drawing Figures

STACKING DEVICE

The present invention relates to a stacking device.

BACKGROUND OF THE INVENTION

For certain items of everyday use, containers are commercially available which may be connected to each other so to form piles or stacks. In particular, magnetic tape cassette containers are such known to have stacking elements at their upper and lower sides of, e.g., dovetail grooves and ledges or keys, respectively. The dovetailed elements on the upper side of each container are complementary to those on the lower side of the same end of each other container.

It is desirable to stack such containers not only vertically to form a compact block but also to connect them horizontally in juxtaposed position. Designs are known in the state of the art where the individual containers have stacking elements at their upper and lower sides but also at the lateral sides which extend perpendicularly with respect thereto. Reference may be had to U.S. Pat. No. 3,514,170.

This solution appears to be acceptable for relatively large containers where the volume occupied by the stacking elements is small relative to the overall volume of the container. This, however, is not true for the tape cassette containers mentioned above. If lateral stacking elements would be provided at them, the containers would have to be provided with considerably thickened lateral walls which not only means increased volume but also increased material expenses.

SUMMARY OF THE INVENTION

It is the object of the present invention to provide a stacking device wherein the space demand for lateral stacking is acceptable even under adverse volume conditions, and wherein the expenses for the used material are also relatively minor.

The characterizing features of the invention define the solution of this problem.

It will be realized that the invention is based on a principle entirely different from that of the design disclosed in the above-mentioned U.S. patent specification. Instead of providing each individual container with lateral stacking elements, such lateral stacking elements are disposed only at intermediate plates which, in turn, are not intended to be used as containers so that they may be extremely thin in order to save material. Moreover, the stacking elements of indentation type, e.g. dovetailed grooves, may be disposed in that volume which, for the containers proper, is needed to house the container contents.

Embodiments of the invention are illustrated in the drawings wherein

Figure 2:
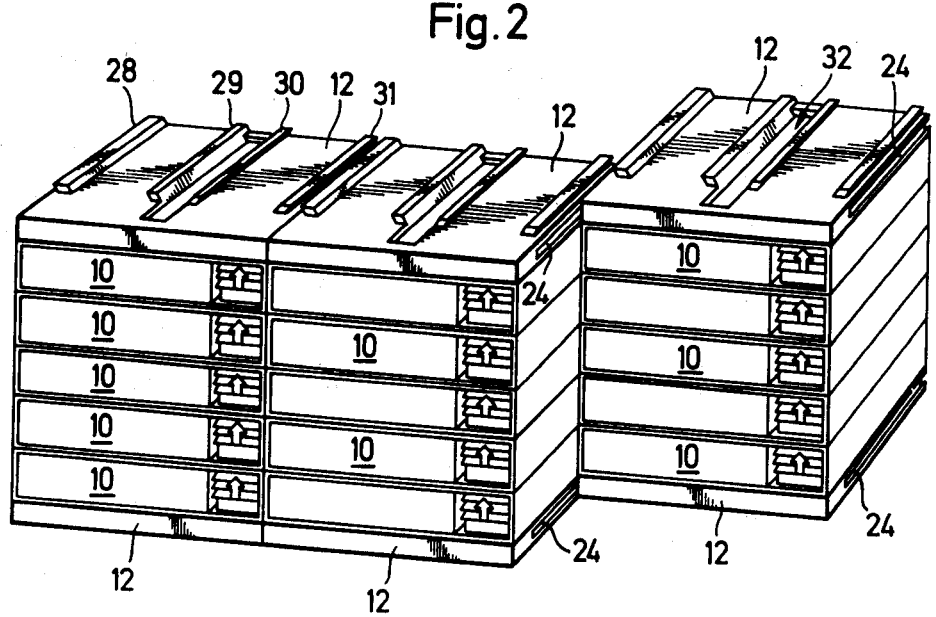
FIG. 2 shows how a block comprising five vertically stacked containers is connected to additional similar blocks by means of such intermediate plates.

Referring first to FIG. 2, there are shown three blocks each comprising five containers for tape cassettes in vertically stacked arrangement. Such containers are disclosed in detail in German Pat. specification No. 2 248 408 to which reference is made. In connection with the present invention, only the stacking elements provided at their upper and lower sides are of interest. At its upper side, each container has ledges with dovetailed profile and at its lower side there are matching grooves complementary to these ledges. The containers are injection-molded of plastic material.

After each five containers 10 there is provided in accordance with the present invention an intermediate plate 12; the number of five containers, of course, is not compulsory but it has been found that only one intermediate plate per five containers will be by far sufficient to form extended blocks in horizontal and vertical direction. Care must be taken, however, that the intermediate plates are disposed at the same position in blocks to be laterally connected.

For lateral stacking, dovetailed ledges and grooves, respectively, are provided also at and in, respectively, the intermediate plates permitting interlocking of two juxtaposed intermediate plates as may be recognized in FIG. 2.

Figure 1:
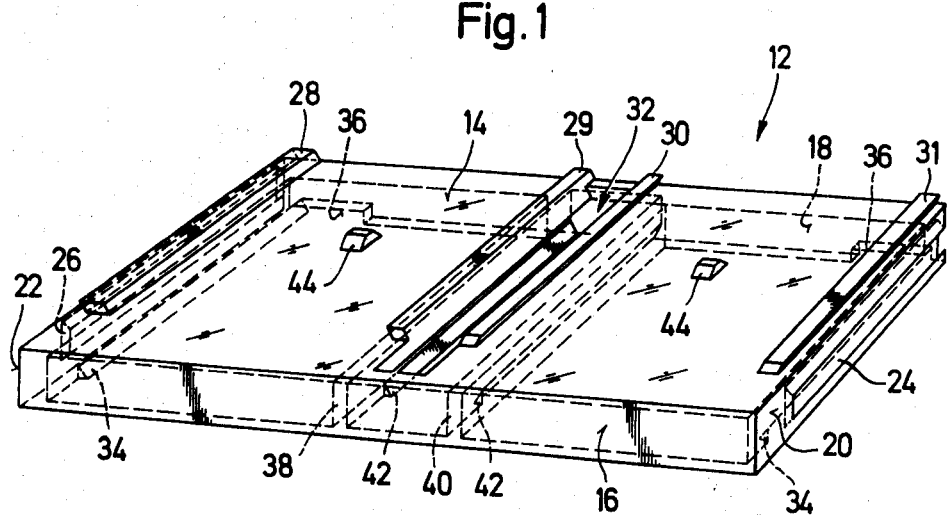
FIG. 1 is an isometric view of the intermediate plate of the invent

FIG. 1 illustrates in a somewhat enlarged scale an individual intermediate plate, it being emphasized, however, that the thickness (vertical dimension) of the plate relative to its horizontal dimensions is exaggerated in both FIGS. 1 and 2 in order to facilitate the comprehension.

It will be seen in FIG. 1 that the intermediate plate is a hollow body having a top wall 14, front wall 16, rear wall 18, and lateral or sidewalls 20 and 22, respectively. Lateral wall 20 has the lateral dovetailed groove 24 while the complementary dovetailed ledge or key 26 extends outwardly from lateral wall 22. The top wall 14 carries dovetailed ledges 28, 29, 30 and 31 which are complementary to the grooves at the bottom side of each container 10, grooves which normally serve the interconnection with another container 10. Between ledge 29 and ledge 30, there is an aperture 32 necessary for injection molding purposes.

At the inner bottom edge of each lateral wall 20, 22 there are keys 34 engaging under those ledges at the upper side of the container which are homologue to ledges 28 and 31, respectively, of intermediate plate 12. These keys 34 may be considered as residuals of groove walls and serve the same purpose. Where the keys 34 intersect rear wall 18, the latter has apertures 36 permittin pushing of the intermediate plate from the front side unto a container.

Beneath ledges 29 and 30, respectively, two webs 38 and 40, respectively, extend downwards from top wall 14, and to the inner bottom edge of these webs undercut keys 42 are integrally formed. Similar to keys 34, they define a groove-like receptacle for those stacking ledges of the container which are homologue to ledges 29, 30 of the intermediate plate 12. An aperture similar in its function to aperture 36 is also provided between the webs 42 in the rear wall 18 in the center thereof but cannot be seen in the drawings.

Figure 3:
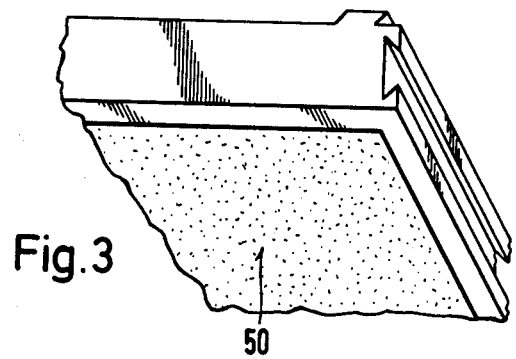
FIGS. 3 and 4 are partial isometric views and illustrate the design of intermediate plates intended as lowermost and uppermost member of a container block, respectively.

The upper side of top wall 14 carries two small protuberances or lugs 44 which upon mounting of a container 10 on the intermediate plate, engage into a bottom-side indentation of such container so to lock the dovetail connection in the pushed-on position. FIG. 3 is an isometric view from the rear side and from the bottom of an embodiment of the intermediate plate intended to be used as the lowermost member of a container block. It is, in contrast to FIG. 1 and 2, not hollow but has a contiguous surface 50 at the bottom side, said surface being preferably roughened or being made non-slipping in any other manner, e.g. by a frictional coating applied by cladding or glueing.

Figure 4:
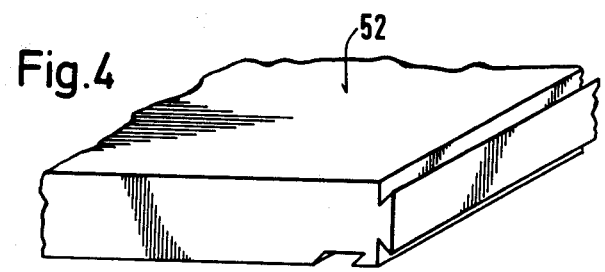

FIG. 4 illustrates the "complement" to FIG. 3: The isometric view from the rear and from top unto an intermediate plate intended as the uppermost member of a container block illustrates that this type of intermediate plate distinguishes from that of FIG. 1 and 2 in that it has a plane, smooth and contiguous upper face 52 on which there are no ledges 28 to 31 nor aperture 32.

Figure 5:
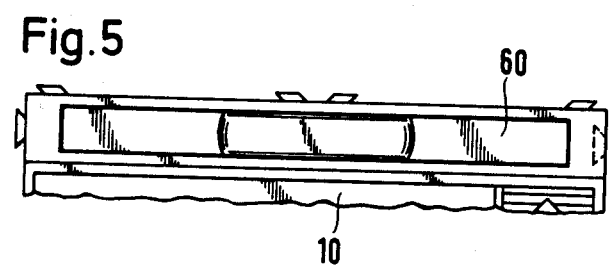
FIG. 5 is an elevation view of an alternative plate embodiment.

FIG. 5 illustrates an alternative embodiment of an intermediate plate which is a hollow frame opening to the front side, i.e. the side to which the sliders of the containers open, too. This framelike plate houses a drawer 60 adapted to store cards or the like relating to the sound information of cassettes, for example. The drawer may be omitted and the cards may simply be piled within the shelve defined by the intermediate plate cavity.

I claim:

1. A connecting device for the combined vertical and side-by-side stacking of rectangular containers which have complementary interlocking stacking elements only on their upper and lower surfaces, the device comprising a plurality of rectangular connector plates of minimal thickness and arranged in edge to edge relation with each other, the connector plates having upper and lower surfaces to confront the bottoms and tops of such containers, and also having lateral sides to confront adjacent lateral sides of adjacent connector plates, the connector plates having complementary interlocking type stacking elements on their upper and lower surfaces to interlock with similar stacking elements of the containers, such that they can be connected between any two containers in a stack, such plates further having complementary interlocking elements on their lateral sides and rigidly securing the lateral sides of adjacent plates together, such that aligned plates in adjacent container stacks can be detachably interconnected, to thereby lock together a plurality of container stacks in a compact block.

2. The device of claim 1 wherein the plates have a height substantially smaller than that of each container.

3. The device of claim 1 wherein the plates are at least partially hollow at their bottoms.

4. The device of claim 1 wherein at least one of the plates has stacking elements only on its upper side and at its lateral sides, and has at its lower side a contiguous face with increased friction coefficient.

5. The device of claim 1 wherein at least one of the plates has stacking elements only on its lower and lateral sides and is provided at its upper side with a smooth contiguous surface.

* * * * *